US010124710B2

(12) United States Patent
El-Wakeel et al.

(10) Patent No.: US 10,124,710 B2
(45) Date of Patent: Nov. 13, 2018

(54) MOBILE KIOSK WITH SHADE STRUCTURE

(71) Applicant: Imam Abdulrahman Bin Faisal University, Dammam (SA)

(72) Inventors: Hala El-Wakeel, Dammam (SA); Asma Yousuf Aloraifi, Dammam (SA); Haifa Alarifi, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 15/815,187

(22) Filed: Nov. 16, 2017

(65) Prior Publication Data

US 2018/0272914 A1   Sep. 27, 2018

Related U.S. Application Data

(60) Provisional application No. 62/474,144, filed on Mar. 21, 2017.

(51) Int. Cl.
*B62B 3/02*   (2006.01)
*B60P 3/025*  (2006.01)
(Continued)

(52) U.S. Cl.
CPC ............ *B60P 3/0257* (2013.01); *A47F 5/108* (2013.01); *B62B 3/02* (2013.01); *B62B 5/0013* (2013.01); *E04H 1/1222* (2013.01)

(58) Field of Classification Search
CPC ......... B62B 3/02; B62B 3/025; B62B 3/0257; B62B 3/022; B62B 2205/00;
(Continued)

(56) References Cited

U.S. PATENT DOCUMENTS 4,417,774 A   11/1983  Bevan et al.
5,692,342 A   12/1997  Devlin, Jr.
(Continued)

FOREIGN PATENT DOCUMENTS

EP          1 000 572        5/2000

*Primary Examiner* — John D Walters
*Assistant Examiner* — James J Triggs
(74) *Attorney, Agent, or Firm* — Oblon, McClelland, Maier & Neustadt, L.L.P.

(57) ABSTRACT

An expandable kiosk structure with a front face, a rear face, a first side structural unit and a second side structural unit arranged such that the front face and rear face are parallel and connect the first and second side structural units to form a box shaped structure that is expandable from a collapsed form an expanded form in which the front face, the rear face, and the first and second side structural units define an interior workspace in the box shaped structure. The front and rear faces each have an outwardly extendable portion that is hingeably or pivotally foldable onto a remaining portion of the front or rear face. Rolling mechanisms are disposed bottom corners and extendable brackets are disposed at the top corners connecting to a shading unit supported by a shading unit support structure. Front and rear shelf units are hingeably attached to the front and rear faces. One or more extendable chassis brackets extend along the length of the top and bottom edges of the front and rear faces to permit expansion of the first and second side structural units. The front face chassis bracket is strongly connected to a perpendicular revolving rod handle (trailer coupler) that aids in maneuvering the kiosk prior to attachment to or subsequent to detachment from its towing vehicle as well as during towing.

12 Claims, 9 Drawing Sheets

(51) Int. Cl.
  *E04H 1/12* (2006.01)
  *A47F 5/10* (2006.01)
  *B62B 5/00* (2006.01)
(58) Field of Classification Search
  CPC ........ B62B 2206/00; B65D 7/24; B65D 7/00; B65D 7/065
  See application file for complete search history.

(56) References Cited

U.S. PATENT DOCUMENTS 9,022,414 B2 * 5/2015 Bell .................. B62B 3/002
                                                      186/57
2010/0319742 A1  12/2010 Prusmack

* cited by examiner

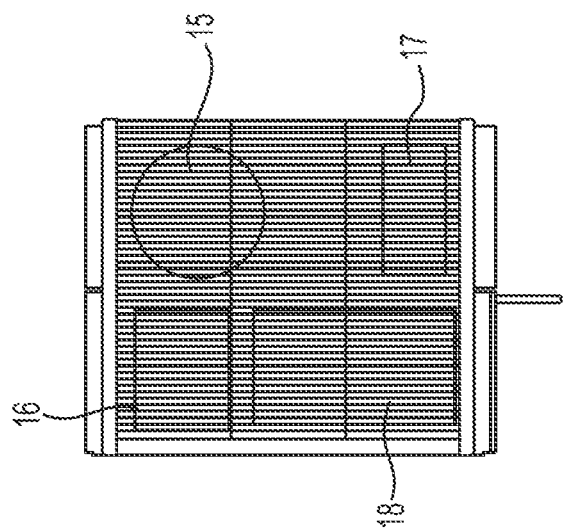
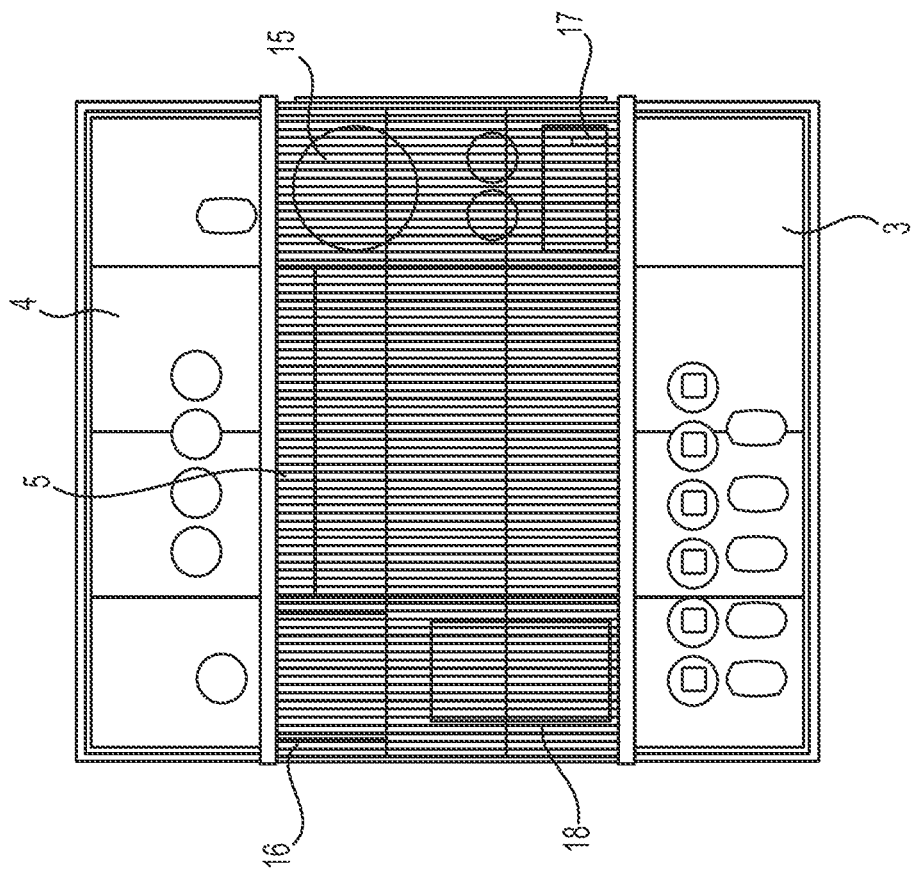

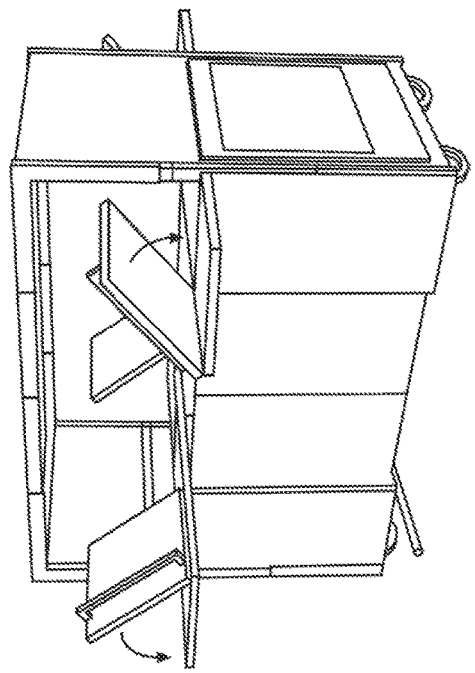
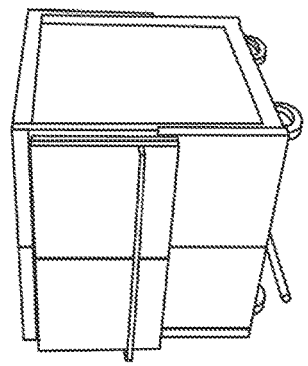
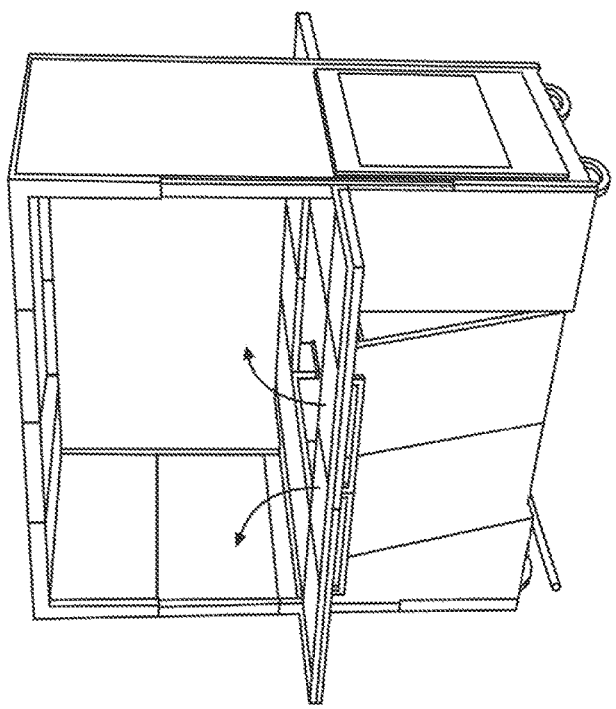
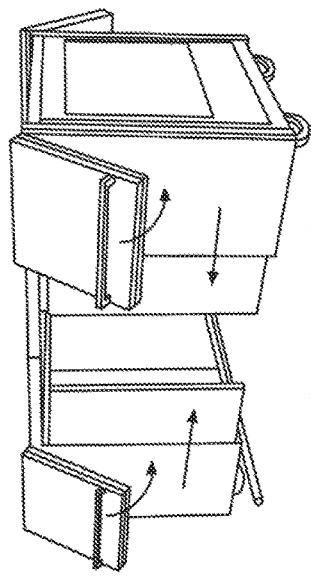
FIG. 14A
FIG. 14B
FIG. 14C
FIG. 14D

MOBILE KIOSK WITH SHADE STRUCTURE

CROSS-REFERENCE TO RELATED APPLICATIONS

The present application claims priority to U.S. Provisional Application No. 62/474,144, having a filing date of Mar. 21, 2017, incorporated herein by reference in its entirety.

BACKGROUND

Field of the Invention

The present disclosure relates to a mobile kiosk having an expandable structure that deploys for service. The mobile kiosk may include food preparatory equipment including a grill and water service and is mounted on a rolling mechanism.

Description of the Related Art

Gathering areas where people meet for certain occasions on a periodic, regular or irregular basis often have a need for food service distribution and/or sales points. Especially under circumstances where individuals are present during times of the day and/or on occasions at which food demand is high, the need for food vendor distribution points is acute. However, certain locations only have seasonal, irregular or variable visitation by sufficient numbers of individuals to make installation of permanent food service locations economically feasible. Nonetheless, on those occasions when many individuals are present the demand for food service is high and the economic opportunity for small business entrepreneurs is attractive.

Conventionally this demand for food service has been met by temporary food distribution devices such as food trucks and food carts. Food trucks have significant mobility and can be easily transported even across long distances. On the other hand, food trucks require the equipment (e.g., a truck or vehicle powered by an internal combustion engine) and the capability necessary in order to lift and transport a food service point and ancillary utilities such as water and electrical service. Such needs greatly increase the cost of food trucks, often making their use economically unfeasible for small business entrepreneurs.

Food carts may lack the mobility of food trucks but do not need a separate locomotion system such as an internal combustion engine if they are powered by human effort such as is the case for a push cart. However, simple food carts suffer from several disadvantages such as limited mobility, the lack of display space and the lack of utility service. Simple push-type food carts also often suffer from a lack of a hygienic appearance and/or professionality.

In order to address the need for highly mobile temporary food distribution and vending points, one object of the present disclosure is a mobile kiosk that has an expandable structure and is highly mobile. The mobile kiosk provides shelter from the elements for vendors or staff and may optionally include food preparation equipment.

SUMMARY OF THE INVENTION

In one aspect the present disclosure includes a mobile kiosk and/or food service point that provides vendor space, display space, and/or food preparation space, and is collapsible to form a highly mobile and expandable structure. In its collapsed form the mobile kiosk is highly mobile and has a footprint substantially smaller than its footprint when in a fully deployed or expanded configuration. The mobile kiosk can be towed or pulled by a vehicle or a bicycle.

In one embodiment the expandable kiosk structure includes a front face, a rear face, a first side structural unit and a second side structural unit, wherein the front face and rear face are parallel and connect the first and second side structural units to form a box shaped structure that is expandable from a collapsed form in which the first and second side structural units are adjacent to one another to an expanded form in which the front face, the rear face, and the first and second side structural units define an interior workspace in the box shaped structure.

In another embodiment the front and rear faces each comprise a portion that is outwardly extendable from the plane of the surface and is hingeably or pivotally foldable onto a remaining portion of the front or rear face.

In another embodiment the box shaped structure has rolling mechanisms disposed at each bottom corner and four extendable brackets disposed at the top corners oriented vertically and connecting to a shading unit supported by a shading unit support structure.

In another embodiment a front shelf unit is hingeably attached to the front face and a rear shelf unit hingeably attached to the rear face and both the front shelf unit and the rear shelf unit are divided into two sections and each section is collapsible and foldable through a hingeable connection.

In another embodiment the kiosk structure has an extendable chassis bracket extending along the length of the top and bottom edges of the front and rear faces to permit collapsing or expansion such that the first side structural unit is adjacent to the second side structural unit.

In another embodiment the kiosk structure has a revolving rod handle (trailer coupler) connected to the front face chassis bracket to be used for towing the kiosk by a vehicle or a bicycle when it is in a fully collapsed or retracted form.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 shows a high level perspective of an aspect of the present disclosure in which a mobile kiosk is in a fully deployed configuration ready for service;

FIG. 6 shows a top level view of an aspect of the present disclosure in which a mobile kiosk is in a retracted or collapsed form;

FIG. 14A describes an aspect of the mobile kiosk and a first step for retraction;

FIG. 14B shows a second step in the collapsed or take down of the mobile kiosk;

FIG. 14C shows an aspect of the invention in which a mobile kiosk is in a further step of collapsing or retraction:

FIG. 14D shows a perspective view of an aspect of the mobile kiosk in a fully closed or retracted configuration;

DETAILED DESCRIPTION OF THE PREFERRED EMBODIMENTS

Figure 1:
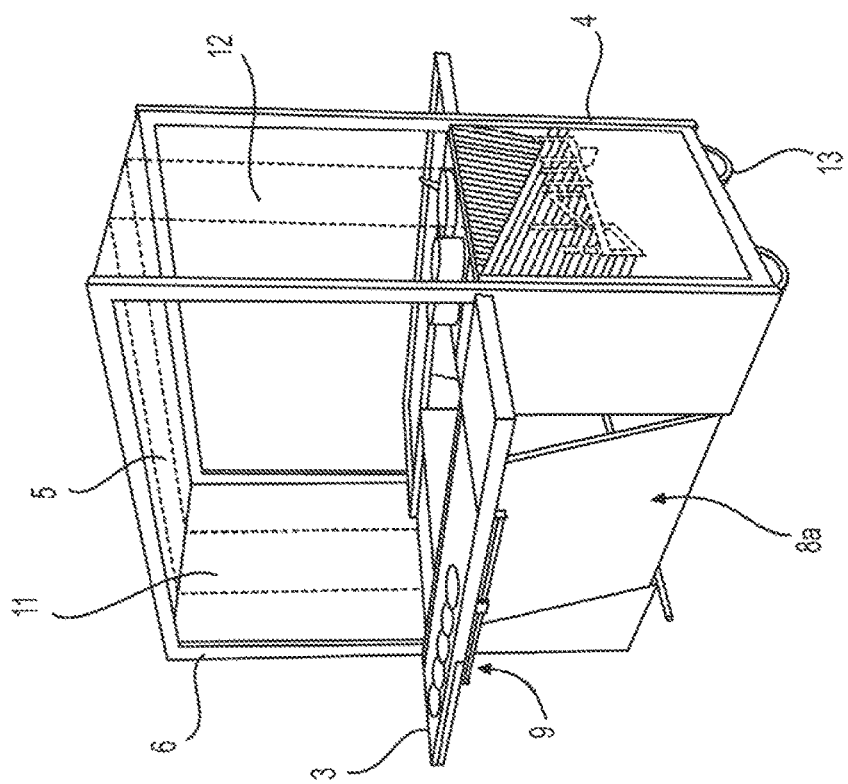
FIG. 1 shows an elevated perspective view of one aspect of the present disclosure.

Aspects and embodiments of the present disclosure will now be described more fully with reference to the accompanying drawings, in which some, but not all of the embodiments of the disclosure are shown. In addition, the present disclosure will be understood with reference to the following definitions.

As used herein, the words "a" and "an" and the like carry the meaning of "one or more". With the description of this disclosure, where a numerical limit or range is stated, the end points are included unless stated otherwise. Also, all values and sub-values including subranges within a numerical limit or range are specifically included as explicitly written out.

The term "comprising" is considered an open-ended term synonymous with terms such as including, containing or having and is used herein to describe aspects of the invention which may include additional components, functionality and/or structure. Terms such as "consisting essentially of" are used to identify aspects of the invention which exclude particular components that are not explicitly recited in the claim but would otherwise have a material effect on the basic and novel properties of the disclosure. Basic and novel properties of the present disclosure include the collapsibility and mobility of a mobile kiosk, the suitability of a mobile kiosk as a vending point, the suitability of a mobile kiosk to provide utility features to public and/or private spaces such as food preparation services. The term "consisting of" describes aspects of the invention in which only those features explicitly recited in the claims are included and thus other components not explicitly or inherently included in the claim are excluded.

A preferred embodiment of the invention includes a mobile kiosk structure that has an expandable structure and functions to provide a vendor point, meeting point, dissemination point or interaction point between one or more individuals. Preferably the mobile kiosk functions as a temporary business transaction point for a vendor of articles such as food service items. In addition, the mobile kiosk may be used for disseminating information such as literature, e.g., tourist information, health information, souvenirs and the like. One main feature of functionality lies in providing a formal structure for a vendor (herein the term "vendor" can refer to an individual in a retail service capacity or other public service capacity) and an individual seeking to make a purchase from the vendor or obtain services from the vendor. Another feature relates to the ease of moving the mobile kiosk and the option for partial disassembly for ease of storage. Although the mobile kiosk is preferably used in an area that experiences periodic visitation, and is preferably in an outdoor setting, it may likewise be used in an indoor setting and/or in a setting, such as a shopping mall where visitation and exposure to the public or to a group of potential customers is relatively constant and predictable.

The term "kiosk" and/or "mobile kiosk" are used herein to describe a structure which functions as a service or business transaction point that can readily accommodate one or more individuals in a retail or vendor-type function and provide services and/or sales to the general public or to any other group of individuals. As used herein this term does not require that any individual is fully encased by the structure, fully covered by the structure or otherwise within particular perimeter of the structure. Preferably at least two individuals are involved in a retail transaction. A vendor is generally located in proximity to the mobile kiosk and a purchaser is generally located in front of the vendor also in proximity to the mobile kiosk. The mobile kiosk is mobile; meaning, that it can be easy transported by unassisted human effort to a new location, for example by pushing or pulling.

The mobile kiosk is also preferably "expandable"; meaning that the mobile kiosk can be partially disassembled or modified to improve mobility, reduce storage space requirements and/or make relocation easier with less human effort.

The mobile kiosk is "temporary" in that it may be expanded (e.g., set up for business) and collapsed to mimic the "opening" and "closing" of a typical conventional indoor retail establishment. The mobile kiosk is "open for business" when it is in an expanded form and "closed for business" when it is in a collapsed or closed position.

In addition to providing a retail and/or temporary retail functionality, the mobile kiosk may additionally provide display space and/or advertising space on one or more exterior surfaces. The display spaces may include conventional hard surface displays or variable displays with moving pictures such as an LED or other similar device.

FIG. 1 describes a preferred embodiment of the expandable kiosk structure in a deployed configuration. The expandable kiosk structure has several basic features are evident to an individual approaching the kiosk structure from the outside. The kiosk has a first side structure 1 and a second side structure 2. The kiosk further has a front face 8 and a rear face 22 (not shown in FIG. 1) substantially parallel to and opposing the front face 8. A shading device or cover 5 is supported by four or more extendable brackets 6 positioned at corners of the expandable kiosk structure. Collapsible display areas and/or serving counters are evident as a front shelf unit 3 and a rear shelf unit 4. A shading element may be present on side portions of the expandable kiosk structure (11 and 12).

The first and second side structural units are connected to one another through an expandable chassis that comprises first and second expandable chassis brackets that connect the front and rear faces of the first and second side structural units. The expandable chassis brackets function to permit expansion of the kiosk structure by separation of the first and second side structural units. The expandable chassis brackets, when in an expanded form, separate the first and second side structural units to form a space there between. The interior space of the kiosk structure accommodate one or more individuals staffing the kiosk structure. The extendable brackets are preferably located at both the top and bottom edges of the first and/or second side structural units.

In one embodiment of the invention the expendable chassis brackets are located only at the top and bottom edges of either the front 8 or rear 22 faces of the kiosk structure. This permits ease of entry into the interior space of the kiosk structure when undergoing expansion.

Figure 2:
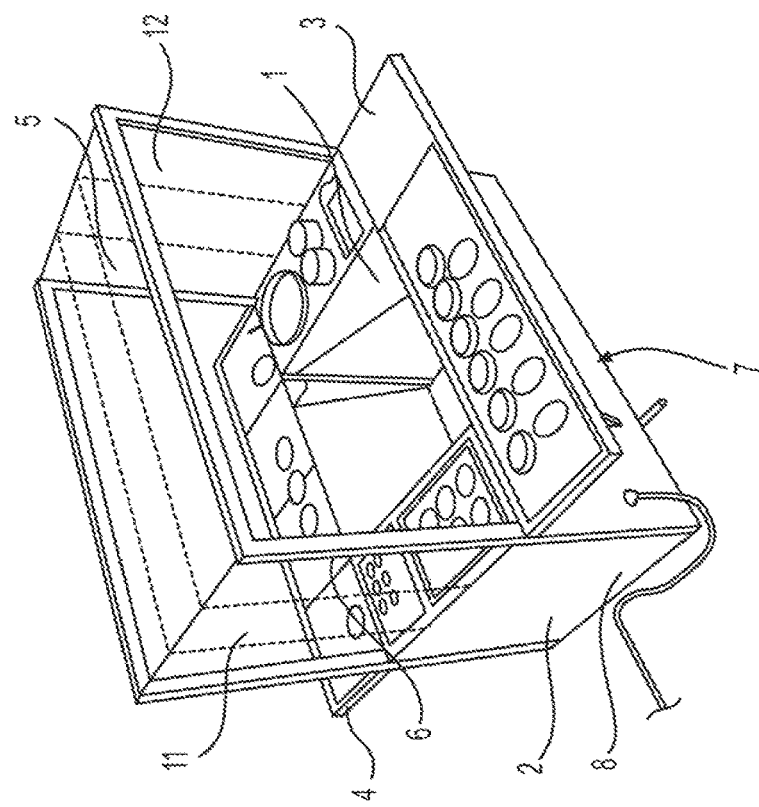
FIG. 2 shows a street-level perspective of one aspect of a mobile kiosk in a food service application.

FIG. 2 shows a street-level perspective of an aspect of the expandable kiosk structure. A mobility enhancing feature that includes wheels, castors or other rolling devices is shown as wheels 13. In the embodiment shown in FIG. 2 the wheels are oriented such that the direction of roll or movement of the kiosk is in line with an axis that is perpendicular to the surfaces of the front face 8 and the rear face 22 of the kiosk. Additional wheels may be mounted at positions other than the corners of the bottom of the kiosk. For example, one or more stabilizing wheels, castors or rollers may be mounted roughly at the middle of the width of the front face 8 or the rear face 22. In other embodiments of the invention the wheels, casters or rollers are oriented such that the direction of roll or travel of the kiosk is in a line that is parallel to the surfaces of the front face and rear face 22. In a further embodiment of the invention the wheels 13 are mounted onto the kiosk such that the orientation of the wheels with respect to the direction of the travel of the kiosk may be changed. For example, as shown in FIG. 2 the wheels are oriented such that the direction of roll of the kiosk is in a line perpendicular with the front face 8 and rear face 22. However, the orientation of the wheels may be changed by 90° such that the orientation of roll of the kiosk is along the line that is parallel to the front face 8 and the rear face 22. This embodiment of the invention is especially preferred because it provides an additional measure of customization and mobility. At least a portion 8a of the front face 8 may be used as a folding or expandable support for the front shelf unit 3. In a preferred embodiment of the invention the bottom surface of the front shelf unit 3 and/or rear shelf unit 4 have an extension that protrudes perpendicularly from the flat plane representing the bottom surface of the shelf unit. The extension provides a support and anchor for the portion 8a of the front/rear face 8/22 that is used to support the front and/or rear shelf unit (3 or 4). The extension serves the purpose of permitting a flat and level top surface when the front or rear shelf unit (3 or 4) is in an extended position. The absence of the extension may otherwise make it difficult to obtain a flat and level surface in which both the front shelf unit and rear shelf unit have top surfaces that are parallel with one another. The front shelf unit 3 may include a grip, handle or other apparatus or structure 9 to aid in deployment of the shelving unit or other features of the expandable kiosk structure.

In another embodiment of the invention portions of the front face 8a and/or the rear face 22a are removable. In this mode of connection portions of the frontal rear face can be removed temporarily to provide access to the interior of the Kea structure when it's expanded form.

Figure 3:
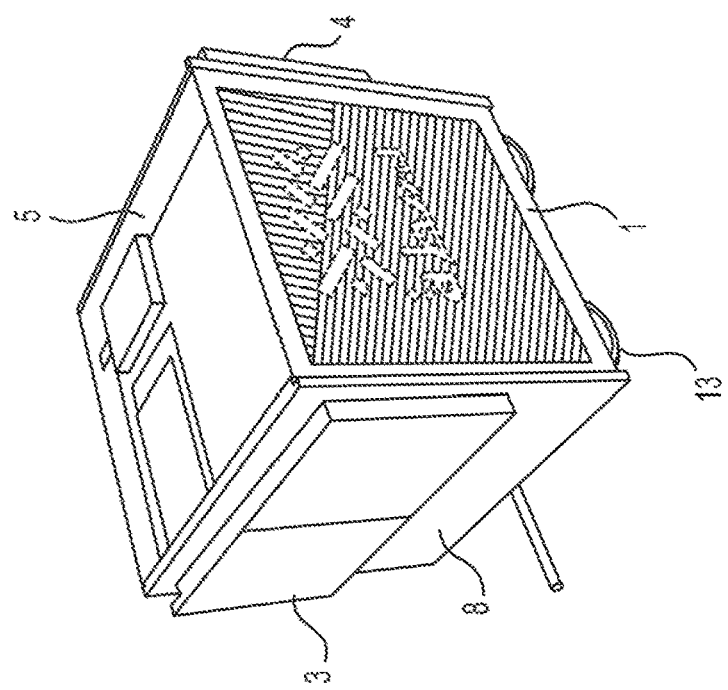
FIG. 3 describes an aspect of the invention in which a mobile kiosk structure is in a collapsed or retracted form.

FIG. 3 shows a high view perspective of the expandable kiosk structure in a collapsed or retracted form. The shade or cover unit 5 now rests on a countertop surface that is integral with the first side structural unit 1 and the first side structural unit 2. The extendable brackets 6 have been substantially retracted into the body of the kiosk. The front shelf unit 3 and the rear shelf unit 4 are retracted and/or folded down such that they are parallel with a front 8 and rear surface 7 of the expandable kiosk unit and retracted lengthwise from the expanded position described in FIGS. 1 and 2. The extendable brackets 6 are preferably retracted into the body of the kiosk such that the shade or covering unit 5 and any supporting perimeter thereof, rests directly on the top surface or top edges of the kiosk. In this manner the shade or covered unit provides a means for excluding access to the kiosk. In still further embodiments of the invention the shade or covering unit 5 is further retractable and may be rolled to one side to expose the top surface of the kiosk in its retracted or collapsed form for purposes such as cleaning and preparation for business.

FIG. 3 also shows that the kiosk structure may have a revolving rod handle (trailer coupler). e.g., a black bar perpendicular to the front face 8 connected to the front face chassis bracket 8, to be used for towing the kiosk when it is in a fully collapsed or retracted form. This revolving towing device aids in maneuvering the kiosk prior to attachment to or subsequent to detachment from its towing vehicle as well as during towing.

Figure 4:
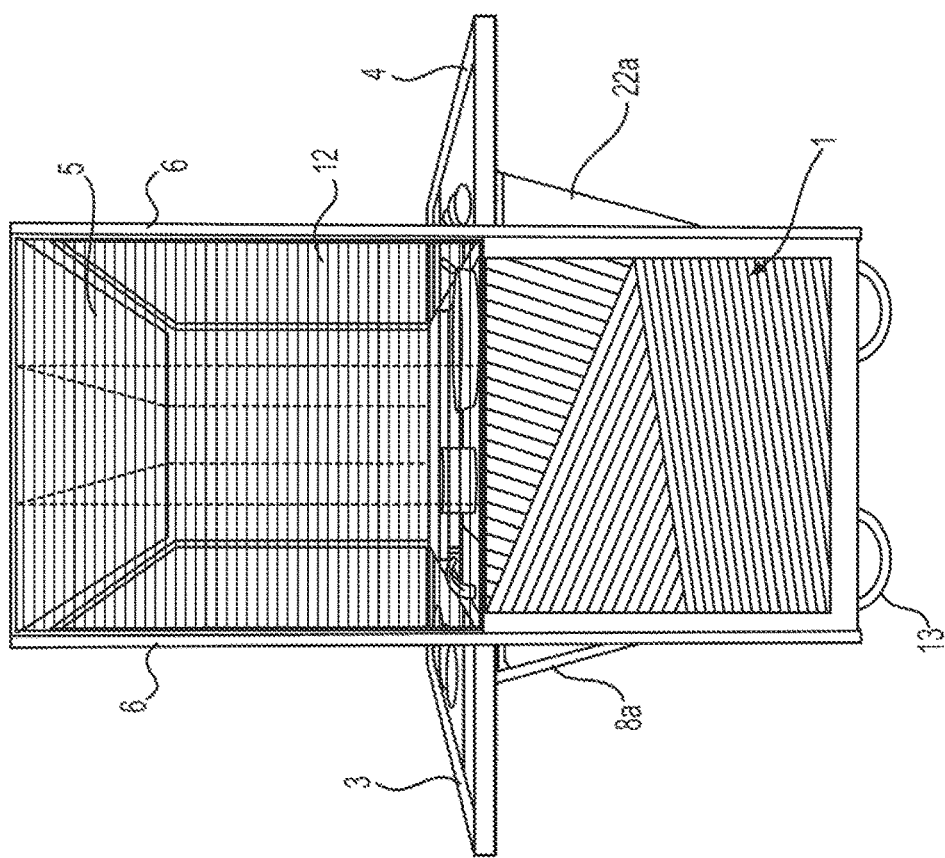
FIG. 4 shows a street-level perspective of a side view of an aspect of the mobile kiosk structure of the present disclosure.

FIG. 4 shows a side elevation of the expandable kiosk structure in its expanded form. In a side view the first side structure 1 represents an outer face of the expandable kiosk structure. The width of the face represented by the side structural unit 1 is the same for a particular expandable kiosk structure irrespective whether it is described in any perspective shown in FIG. 1, 2, 3 or 4. In a preferred embodiment the first side structural unit 1 and the second side structural unit 2 have a fixed width that is neither expandable nor collapsible. In the side view, portions 8a of the front face 8 and portions 22a the rear face 22 of the expandable kiosk structure support the front shelf unit 3 and the rear shelf unit 4. A portion of the front face 8, shown as 8a in FIG. 4, is extended outwardly to provide a physical support and means for supporting the weight of the first shelf unit 3. Opposing the front face 8, the rear facing portion of the kiosk structure 22 also includes a portion 22a that may be folded out or otherwise extended to provide a physical support for the rear shelf unit 4. The extendable vertical supports 6 provide a means for holding a shading device at both the top 5 and the side portions 12 and 11 (not shown in FIG. 4) when in a fully deployed or expanded configuration. The wheels shown in the side view of FIG. 4 are parallel to the face of the first structural unit 1. In other embodiments of the present disclosure the wheels 13, or other rolling device, may be offset or perpendicular to the first structural unit 1 and/or the second structural unit 2 of the expandable kiosk structure.

As shown in the figures the kiosk structure has a box-like structure having a top, a bottom and four sides. The sides of the box-like structure represent the exterior surfaces of the front face 8, the rear face 22 and the first and second side structural units. The bottom of the box-like structure is formed from the bottom of the first and second side structural units when the box-like structure is in its collapsed form. Likewise, the top of the box-like structure represents the top and exposed surfaces of the first and second side structural units when the kiosk structure is in an expanded or collapsed form.

The expandable kiosk structure may have various utility functions and/or equipment. The top view of the expandable kiosk structure shown as FIG. 5 shows a sink unit 17, a first grilling unit 15, a second grilling unit 16 and a third grilling unit 18. The grilling units may serve purposes other than grilling. For example, one or more of the grilling units 15, 16 and 18 may perform a warming or cooling function. For example, one or more of these units may serve a food preparation purpose that is other than grilling, boiling and/or microwaving, for example. The front shelf unit 3 and/or the rear shelf unit 4, when in an expanded or deployed form may hold or carry articles other than food articles. Such articles may include condiment packages, decoration or other food service devices or articles.

The utility equipment (e.g., devices) such as the grilling units 15, 16, 18 and/or the water service unit (sink) 17 preferably remain in the expandable kiosk structure when it is in a retracted or collapsed form. As noted before, the width of the first side structural unit 1 and the second side structural unit 2 does not change upon collapse or retraction of the expandable kiosk structure. As such, any of the utility functions 15, 16, 17 or 18 may be permanently affixed or installed in the kiosk structure. In other embodiments one or more of the utility functions may be easily removed for cleaning or for exchange with other functional devices.

In the fully retracted form shown in FIG. 6, the expandable kiosk structure no longer accommodates a vendor or individual in an interior location. Upon retraction or collapse there is no space inside the kiosk structure from which to service any of the utility devices 15, 16, 17 or 18. This does not, however, prevent their use when the expandable kiosk structure is in a fully collapsed form. In one embodiment of the invention the retracted or collapsed kiosk structure remains mobile and functional with respect to one or more of the utility functions 15, 16, 17 or 18. In this respect the kiosk structure may be moved from one location to another to maintain, for example, a cooking function, a cleaning function, a warming function or a display function. Preferably, the expandable kiosk structure is used in its fully expanded and open configuration such that the utility devices 15, 16, 17 and/or 18 are accessible from an interior space inside the kiosk structure rather than from outside the kiosk structure.

Figure 7:
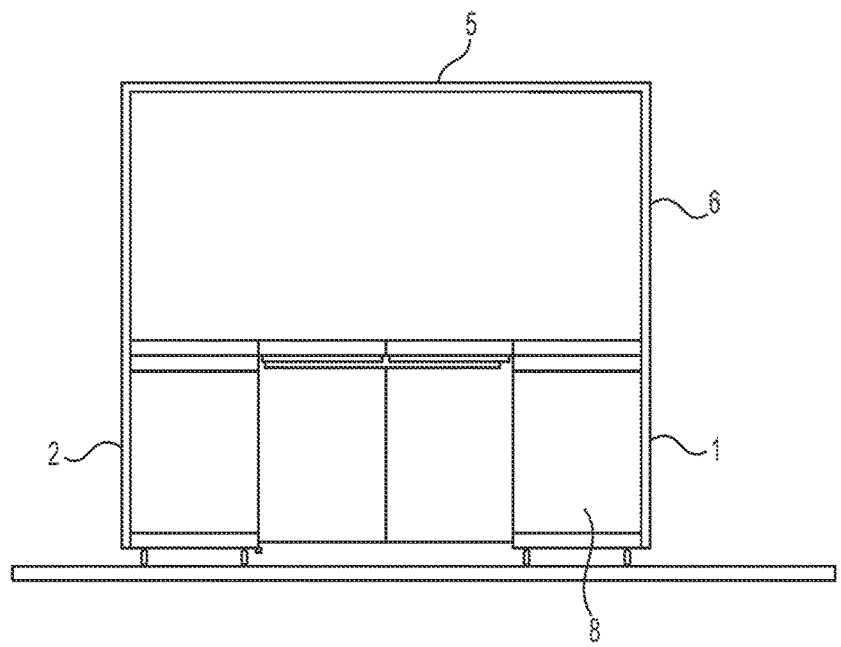
FIG. 7 shows a side-view perspective of a mobile kiosk structure.

FIG. 7 shows a side elevation of an embodiment of the expandable kiosk structure. The height of the expandable kiosk structure in its expanded or deployed form measured from the bottom of the first side structural unit 1 or the second side structural unit 2 is preferably in a range of from 1 to 2.5 meters, preferably from 1.5 to 2 meters. In this configuration the extendable brackets 6 are in their fully extended and deployed form. In some embodiments of the invention the side structural units 6 may be partially deployed such that the shading unit 5 is not fully elevated and/or only partially elevated. In another embodiment of the invention the extendable brackets 6 may be adjusted to have different heights. For example two brackets may have a first height and two other brackets may have a second height that is different from the first height. In this way the shading unit or coving unit 5 can be placed at an angle more convenient for shading or for protection from the elements.

Preferably in a front view the expandable kiosk structure, when in a fully expanded or deployed form, provides a completely closed or blocked view in the portion represented by the front face 8. The same preference holds for the rear face 22 when viewed from a perpendicular perspective. The extendable brackets 6 may be retracted or folded down such that a side shade or security screen 12 covers the exterior portions of the first side structure 1 or the second side structure 2. In other embodiments of the invention collapse or retraction of the extendable brackets 6 causes retraction and/or other stowage of any shade structure 15 present on side portions of the expandable kiosk structure.

Figure 8:
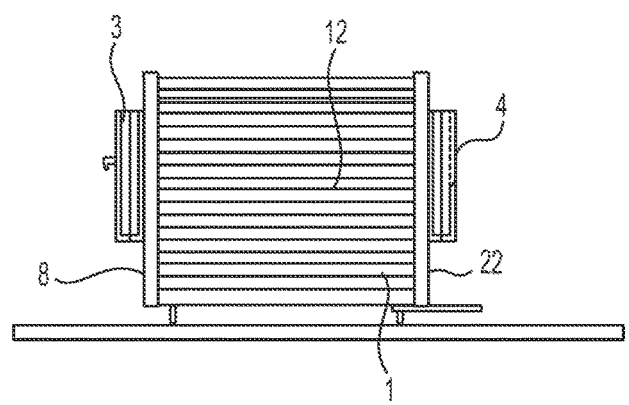
FIG. 8 shows a side-view of a mobile kiosk in a collapsed configuration.

The shelf units 3 and 4 described in the side view shown in FIG. 8 are in a retracted or folded form. In order to provide sufficient length to extend substantially all of the width of the expandable kiosk structure when seen in a front view (see FIG. 7), the shelving units may be retracted or folded upon themselves to provide a two-layer folding protrusion on a face of the expandable structural unit such as 8.

Figure 9:
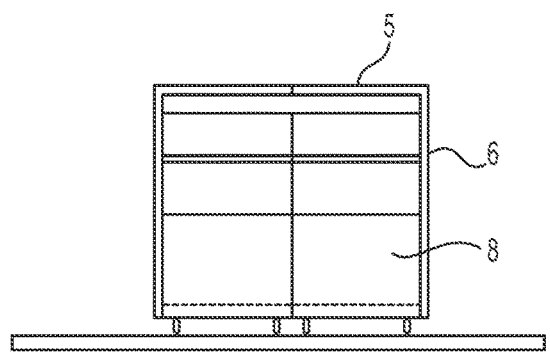
FIG. 9 shows a front view of a mobile kiosk structure in a collapsed form.

Preferably the front shelf unit and the rear shelf unit 3 and 4 are each divided into four or more sections pivotably or hingeably attached to one another. In this embodiment of the invention a first portion representing the outermost edge of the shelf unit is hingeably or pivotally attached to an edge of, for example, the front face 8 of the kiosk. The shelf unit is further divisible into two portions with each portion having an outermost edge attached to the front face. Each resulting section is further divided into a portion that is hingeably attached to the outermost edge portion which is hingeably attached to the front face 8. This second or inner portion is foldable on top of or to the bottom face of the portion of the shelf unit that is hingeably attached to the front or rear face 8 or 22. When the expandable kiosk structure is retracted the shelf unit 3 or 4 is converted to a collapsed form by first folding the hingeably attached inner portion of the shelf unit onto the top of the outermost edge portion of the shelf unit. The combined portion is then hingeably folded down to rest upon the front face 8 of the kiosk. This folding occurs twice for each shelf unit to accommodate both sections thereof. FIG. 8 shows these stacked inner and outer portions of the shelf unit 3 and 4 resting on the front face 8 and rear face 22 of the kiosk in a collapsed or retracted form. The front face and/or rear face 22 of the kiosk may have similar folding and hingeably attached portions. For example, the portions 8a and 22a which may fold or extend outwardly from the faces 8 and 22 to provide support for the shelf unit 3 and/or 4 may be hingeably attached to a bottom edge of the kiosk representing the front and bottom edge of the front face 8 or 22. The portions 8a and 22a may also be hingeably attached to the remaining portion of the front face 8 and the rear face 22 such that a lengthwise or partial hinge may be engaged or disengaged as needed depending on whether the intended function of the portion 8a and/or 22a is to support a shelf unit or to be placed into a collapsed form. Hinge or pivot attachment to the remaining portion of the front and/or rear faces 8 and 22 permits the extendable portions 8a and 22a to be folded over on top of the remaining portion for storage and transport during a period when the kiosk is rolled or placed into a mobile function. This aspect of the disclosure is shown in FIG. 9 in which the front face is shown approximately one-half the width of its width when in an expanded form. The shortened form is achieved when the portion 8a is folded over on top of or behind the portion permanently affixed to the chassis of the kiosk structure. The shading or cover portion 15 is mounted on a rail system that has at least two sides which are extendable or retractable in a similar manner as the extendable brackets 6. As the kiosk is collapsed or placed in retracted form the width (as seen in FIG. 7 as a front view) is substantially decreased. The decrease in length is accommodated by contraction in the support for the shading unit 5.

FIG. 9 shows a front view of the expandable kiosk structure in its fully retracted form showing an extendable bracket 6 and a top shading or screening portion 5. The front face 8 has exterior surfaces that are substantially parallel with one another.

Figure 10:
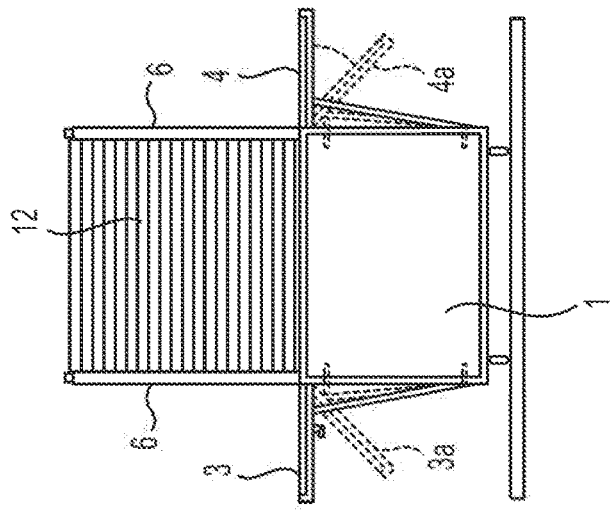
FIG. 10 shows a side view of an aspect of the present disclosure in which a mobile kiosk in a deployed form showing disengagement options for one or more shelfing units.

In its fully deployed form the expandable kiosk structure is shown as a side view in FIG. 10. The front shelf unit 3 and the rear shelf unit 4 are shown together with partially collapsed configurations for the shelving units 3 and 4 shown in dotted line (3a and 4a). The extendable brackets 6 are expanded in their upward position to support the side screen 12. The first side structural unit 1 is shown in the side elevation.

Figure 11:
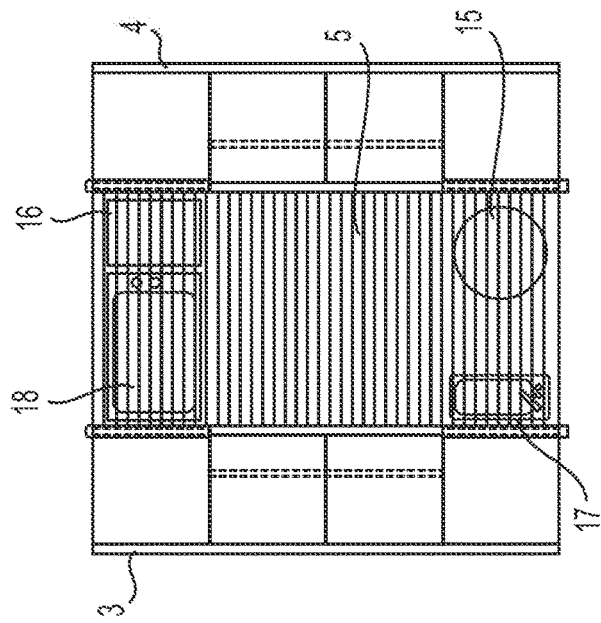
FIG. 11 shows a top view of an aspect of the mobile kiosk in which utility functions are shown.

FIG. 11 shows a line diagram of a top view of the expandable kiosk structure in its fully deployed form. The positions of the utility functions 15, 16, 17 and 18 are shown. Preferably at least one grilling function 15 is disposed closely to the water utility function 17 although in other embodiments the layout of particular functional devices may be different and/or may not include one or more of the units described in FIG. 11. The front shelf unit 3 and the rear shelf unit 4 are shown in their deployed positions. The area that is inside the expandable kiosk structure is covered by the ceiling or shading unit 5 which may be solid, or partially solid to accommodate different levels of shading and lighting.

Figure 12:
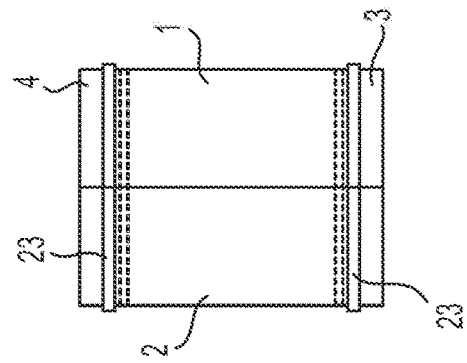
FIG. 12 shows a top view of an aspect of the mobile kiosk in a retracted configuration.

FIG. 12 shows a top view of the expandable kiosk structure in its collapsed form whereby first and second side structural units 1 and 2 are pressed together. Collapsed and retracted front and rear shelf units 3 and 4 protrude or extend from the front face f or rear face 22. The extendable brackets 6 may connect to perpendicularly oriented support rods 23 to provide a U-shaped support structure that fits snugly around the first and second side structural units 1 and 2 when in a collapsed position.

Figure 13:
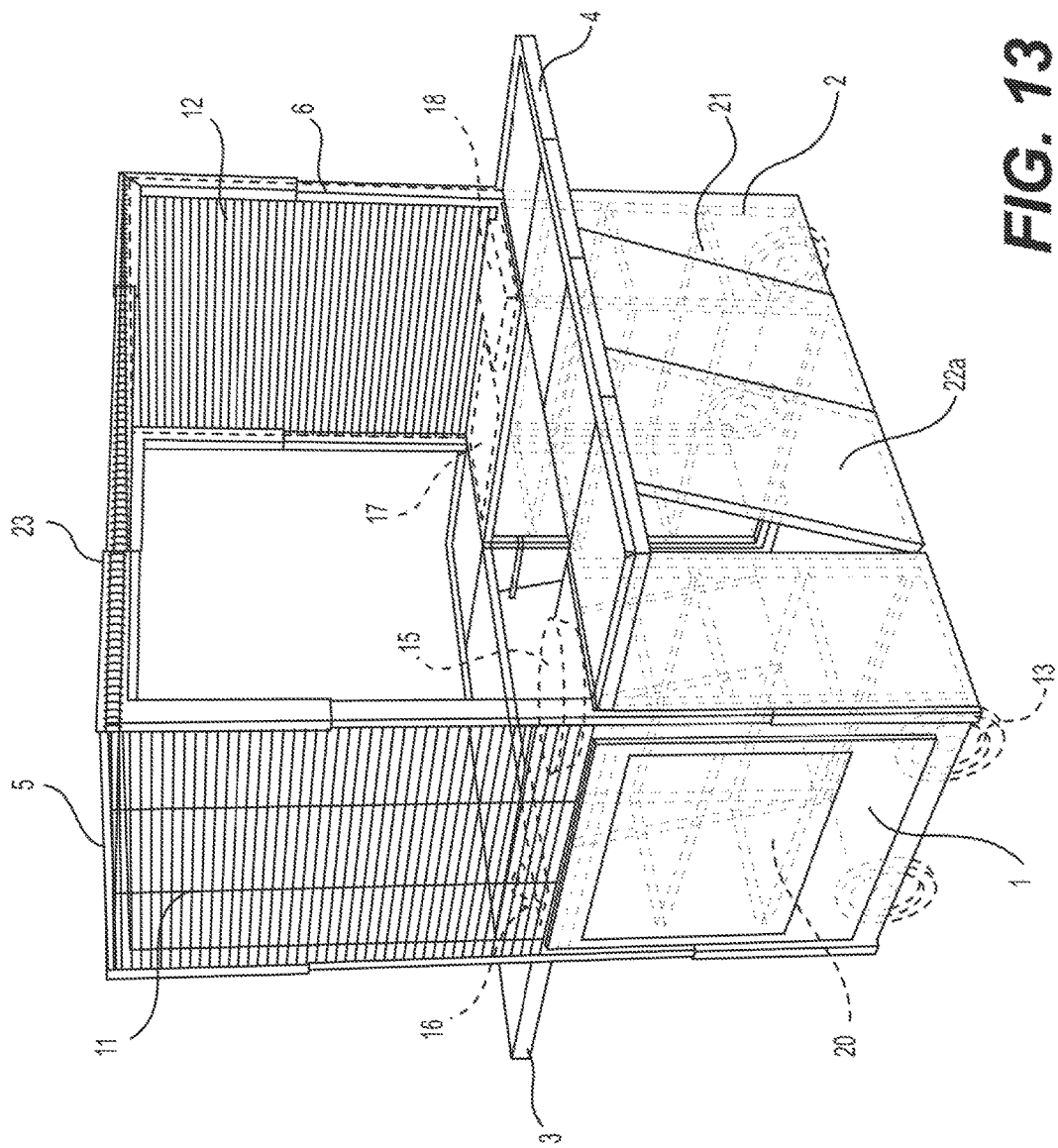
FIG. 13 shows a perspective view of an aspect of the mobile kiosk showing interior and exterior details.

FIG. 13 shows a street-level perspective of the expandable kiosk structure including both interior and exterior detail. Interior detail includes shelving units and/or interior structure 21 that may be located in either the first side structural unit 1 or the second side structural unit 2. This interior space may include shelving and/or storage units and/or may be occupied by utility features such as a compressed gas storage, refrigeration, heated or cooled storage or other food preparation or food storage facilities. The extendable brackets 6 are shown in a fully deployed form connecting perpendicularly with a shading or cover support 23. In this manner the shading areas 5, 11 and 12 are supported on at least two axes. An outwardly folding portion of the rear face 22 is shown as 22a. In its outwardly folded position this portion of the rear face 22 provides support for the rear shelf unit 4. Both the outwardly folding portions 8a and 22a are preferably hingeably or pivotally attached to the first side and second side structural units 1 and 2, respectively.

Figure 14F:
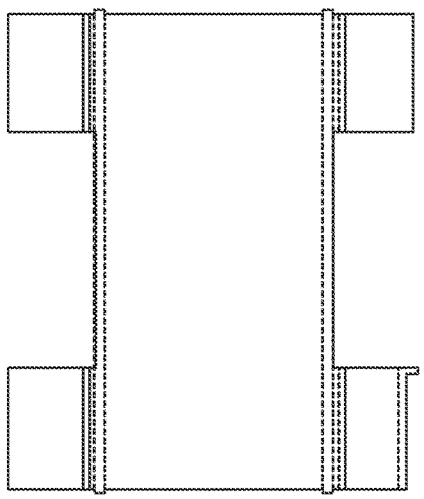
FIG. 14F describes an aspect of the mobile kiosk which is in a partially deployed or expanded form in a top view.
Figure 14H:
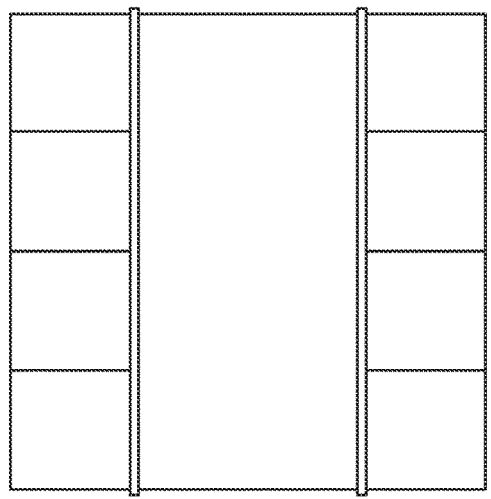
FIG. 14H shows a top view of an aspect of the mobile kiosk in its fully deployed or fully opened configuration.
Figure 14E:
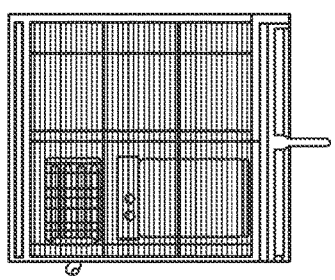
FIG. 14E shows an aspect of the mobile kiosk in a top view in which an expandable structure is in a retracted or collapsed form.
Figure 14G:
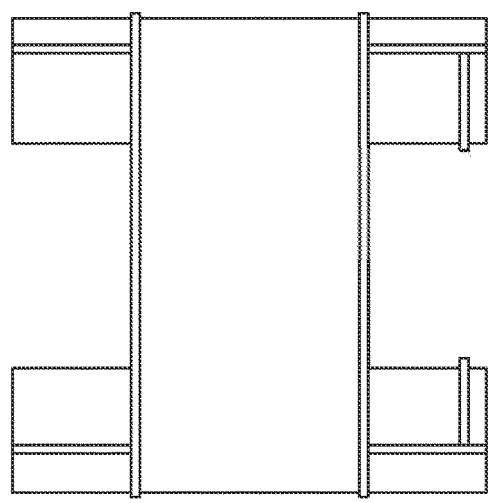
FIG. 14G shows a top view of an aspect of the mobile kiosk that is in a partially expanded or deployed configuration.

The expandable kiosk structure may be expanded and/or retracted in a series of steps. FIGS. 14A-H illustrate a series of steps that may be carried out in order to retract the expandable kiosk structure from a fully deployed or expanded form to a fully collapsed or retracted form. FIG. 14A shows an example of a first step of retraction. The change from fully expanded to partially expanded form is shown in top view in FIG. 14G. As a first step in FIG. 14A portions of the front shelf unit 3 and/or the rear shelf unit 4 are folded upward such that the first shelf unit 3 is shortened in total length and is represented by two separate portions each supported by the first side structural unit 1 or the second side structural unit 2, individually. FIG. 14B demonstrates the lifting and subsequent resting of portions of the front shelf unit 3. Concurrently the height of the expandable bracket 6 is reduced from its fully expanded to partially retracted form. The expandable brackets 6 are subjected to pressure and/or a latching release mechanism such that the height of the structural unit is reduced by about 50%, preferably from 20 to 80%, 30 to 70% or about 50%. A top view 14G shows the retraction and folding of portions of the front shelf unit 3 and the rear shelf unit 4. FIG. 14C shows further steps whereby the shading or covering 5 and the expandable brackets 6 are further retracted and pressed into the bodies of the first and second side structural units 1 and 2, respectively. The outwardly folding portions of the front face 8a and the rear face 22a are slidably retracted and/or folded inwardly. Retraction is preferably carried out by engaging the portions 8a and/or 22a in a sliding rail that is mounted underneath a top surface of the structural units 1 and 2. The folded portions of the front shelf unit 3 and the rear shelf unit 2 are further folded downwardly to rest on the remaining portion of the front exposed surface 8 and rear surface 22. The top view 14F demonstrates the partial folding down of the remaining portions of the front and rear shelf units 3 and 4. Finally, the first and second side structural units 1 and 2 are pressed towards one another until they are in contact with one another and there is substantially no interior space remaining between the first and second side structural units. The side view FIG. 14D and the top view FIG. 14E show the closed or retracted or collapsed configuration that results when the first and second side structural units are combined into a single unit.

Figure 15:
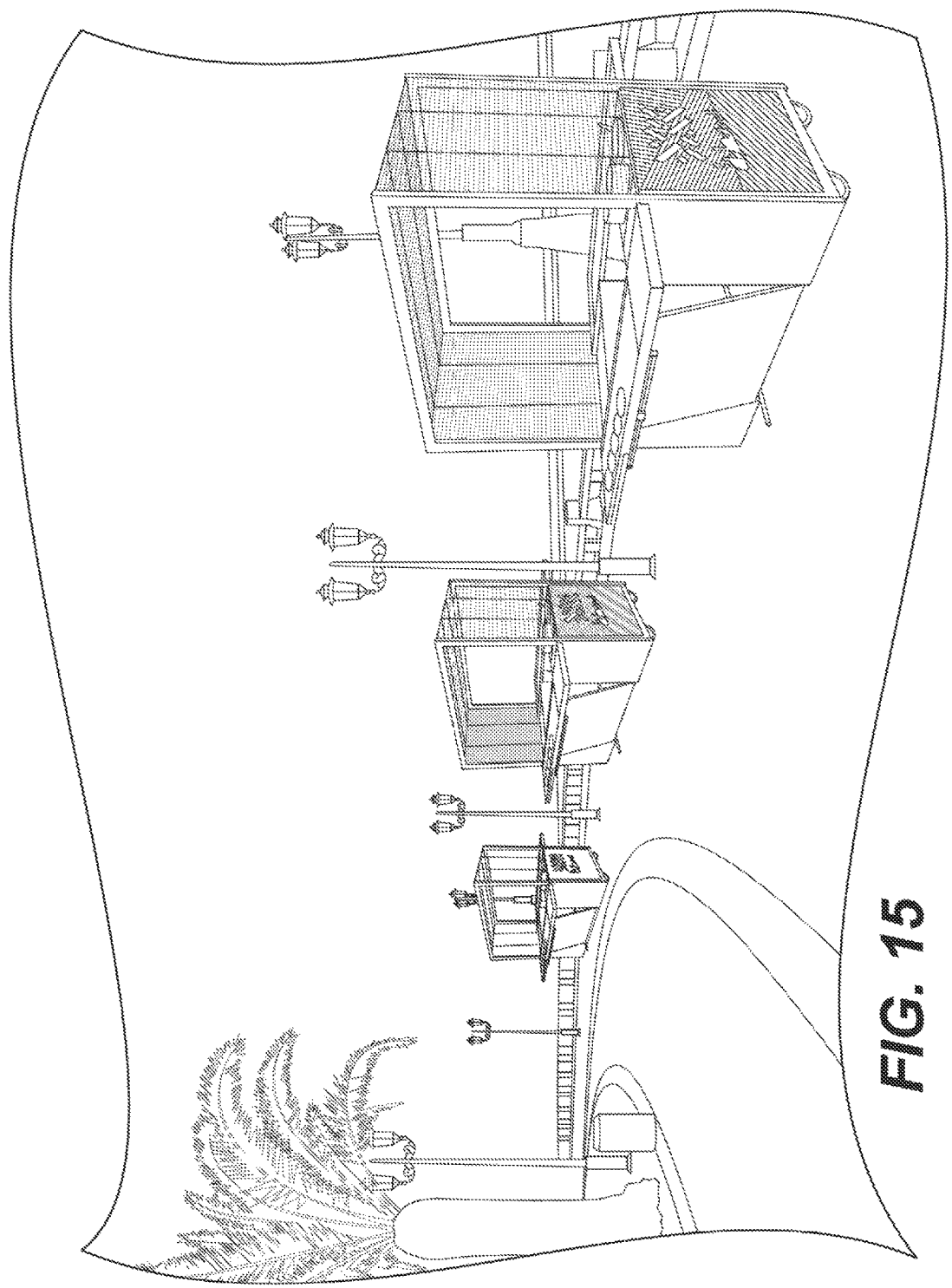
FIG. 15 shows a plurality of a plurality of the mobile kiosks in a public setting deployed and configured as food vending or food distribution points.

FIG. 15 describes an embodiment in which a plurality of expandable kiosk structures in a fully expanded or deployed configuration are arranged for business in a food service application in a public space.

Obviously, numerous modifications and variations of the present invention are possible in light of the above teachings. It is therefore to be understood that within the scope of the appended claims, the invention may be practiced otherwise than as specifically described herein.

The invention claimed is:

1. An expandable kiosk structure, comprising:
   a front face, a rear face, a first side structural unit and a second side structural unit, wherein the front face and rear face are parallel and connect the first and second side structural units to form a box shaped structure that is expandable from a collapsed form in which the first and second side structural units are adjacent to one another to an expanded form in which the front face, the rear face, and the first and second side structural units define an interior workspace in the box shaped structure,
   wherein the front and rear faces each comprise a portion that is outwardly extendable from the plane of the surface and is hingeably or pivotally foldable onto a remaining portion of the front or rear face,
   wherein the box shaped structure has rolling mechanisms disposed at each bottom corner and four extendable brackets disposed at the top corners oriented vertically and connecting to a shading unit supported by a shading unit support structure,
   a front shelf unit hingeably attached to the front face and a rear shelf unit hingeably attached to the rear face, wherein both the front shelf unit and the rear shelf unit are divided into two sections and each section is collapsible and foldable through a hingeable connection,
   an extendable chassis bracket extending along the length of the top and bottom edges of the front and rear faces, wherein the extendable chassis brackets are collapsible or expandable such that the first side structural unit is adjacent to the second side structural unit.

2. The expandable kiosk structure of claim 1, further comprising a grip or handle disposed at a front edge of at least one of the front shelf unit and the rear shelf unit.

3. The expandable kiosk structure of claim 1, wherein each rolling mechanism is oriented to roll in a perpendicular direction relative to the front face of the expandable kiosk structure.

4. The expandable kiosk structure of claim 1, wherein the rolling mechanism is oriented to roll in a direction that is relative to the front face of the expandable kiosk structure.

5. The expandable kiosk structure of claim 1, further comprising:
   a side shading or cover unit disposed above and parallel to the outside face of the first side structural unit or the second side structural unit.

6. The expandable kiosk structure of claim 1, further comprising:
   one or more utility devices disposed on a top surface of one or more of the first and second side structural units.

7. The expandable kiosk structure of claim 1, wherein at least one of the front and rear faces comprises a portion that is outwardly extendable to support the from shelf unit or the rear shelf unit.

8. The expandable kiosk structure of claim 1, wherein each of the extendable brackets is independently capable of full extension or partial extension.

9. The expandable kiosk structure of claim 1, further comprising:
   a first top extendable chassis support at a top of at least one of the front face and the rear face, a first bottom extendable chassis support at the bottom of at least one of the front face and the rear face.

10. The expandable kiosk structure of claim 1, comprising:
    a second top extendable chassis support at a top of at least one of the front face and the rear face, a second bottom extendable chassis support at the bottom of at least one of the front face and the rear face.

11. The expandable kiosk system of claim 1, wherein the inner surface of both the front and rear faces has a reversible snap fit locking mechanism to ensure the perfect closure and fully retracted configuration of the expandable kiosk structure.

12. The expandable kiosk system of claim 1, wherein the kiosk structure further comprises a revolving rod handle connected to the front face chassis bracket and configured to tow the kiosk in a fully collapsed or retracted form.

* * * * *